United States Patent
Tan et al.

(10) Patent No.: US 7,780,763 B2
(45) Date of Patent: Aug. 24, 2010

(54) METHOD OF DESORBING A VOLATILE COMPONENT FROM A SPENT ADSORBENT WITH ROTATING PACKED BED AND METHOD OF RECOVERING 2,2,3,3-TETRAFLURO-1-PROPANOL FROM A GAS STREAM BY ADSORPTION

(76) Inventors: Chung-Sung Tan, Department of Chemical Engineering, National Tsing Hua University, 101 Kuang Fu Road, Sec. 2, Hsinchu (TW); Pei-Lun Lee, Department of Chemical Engineering, National Tsing Hua University, 101 Kuang Fu Road, Sec. 2, Hsinchu (TW)

( * ) Notice: Subject to any disclaimer, the term of this patent is extended or adjusted under 35 U.S.C. 154(b) by 489 days.

(21) Appl. No.: 11/706,181

(22) Filed: Feb. 15, 2007

(65) Prior Publication Data

US 2008/0197079 A1    Aug. 21, 2008

(51) Int. Cl.
*B01D 53/06* (2006.01)
(52) U.S. Cl. .............................. 95/107; 95/90; 95/142; 95/900; 96/108; 96/143
(58) Field of Classification Search ............. 95/90–148, 95/900–903; 96/108–155
See application file for complete search history.

(56) References Cited

U.S. PATENT DOCUMENTS

| | | | | |
|---|---|---|---|---|
| 3,721,100 A | * | 3/1973 | Bovio | 62/55.5 |
| 3,865,924 A | * | 2/1975 | Gidaspow et al. | 423/230 |
| 4,124,528 A | * | 11/1978 | Modell | 210/670 |
| 4,283,255 A | * | 8/1981 | Ramshaw et al. | 203/49 |
| 4,595,575 A | * | 6/1986 | Oeste et al. | 423/210 |
| 4,701,189 A | * | 10/1987 | Oliker | 95/113 |
| 4,761,970 A | * | 8/1988 | MacCracken | 62/500 |
| 4,764,187 A | * | 8/1988 | Abrams | 95/14 |
| 4,893,792 A | * | 1/1990 | Nemoto et al. | 266/227 |
| 5,120,331 A | * | 6/1992 | Landy | 95/90 |
| 5,227,570 A | * | 7/1993 | Tan | 585/822 |
| 5,233,098 A | * | 8/1993 | Nakazora et al. | 568/842 |
| 5,738,710 A | * | 4/1998 | Omata et al. | 95/107 |
| 6,361,696 B1 | * | 3/2002 | Spiegelman et al. | 210/662 |
| 2007/0224103 A1 | * | 9/2007 | Shimizu | 423/437.1 |

OTHER PUBLICATIONS

Goto et al. (Application of Supercritical Fluid technology to Citrus Oil Processing) Physica B 239 (1997) 167-170.*

(Continued)

*Primary Examiner*—Jason M Greene
*Assistant Examiner*—Anthony Shumate
(74) *Attorney, Agent, or Firm*—Bacon & Thomas, PLLC (57) ABSTRACT

A method of desorbing a volatile component from a spent adsorbent is disclosed, which includes flowing a stream of supercritical carbon dioxide through a rotating packed bed of the spent adsorbent; and collecting an effluent from the rotating packed bed, which contains supercritical carbon dioxide and the volatile component entrained therein. In one embodiment of the present invention a spent activated carbon from a process for recovering 2,2,3,3-tetrafluro-1-propanol from a gas stream containing 2,2,3,3-tetrafluro-1-propanol is regenerated by flowing a stream of supercritical carbon dioxide through a rotating packed bed of the spent activated carbon.

6 Claims, 5 Drawing Sheets

OTHER PUBLICATIONS

Guo et al. (Hydrodynamics and mass transfer in crossflow rotating packed bed) Chemcial Engineering Science), vol. 52, Nos. 21-22 pp. 3853-3859, 1997.*

Lin et al. (Removal of Carbon Dioxide by Absorption in a Rotating Packed Bed) Ind. Eng. Chem. Res. 2003, 42, 2381-2386.*

Rao et al. (Process Intensification in Rotating Packed Beds (HIGEE): An Appraisal) Ind. Eng. Chem. Res. 2004, 43, 1150-1162.*

Tan et al. (Supercritical CO2 desorption of toluene from activated carbon in rotating packed bed) J. of Supercritical Fluids 46 (2008) 99-104.*

Lur'E et al. (The Determination of Volatile Phenols in Waste Waters from Pharmaceutical Manufacture) Translated from Khimiko-Farmatsevticheskii Zhurnal, vol. 8, No. 8, pp. 54-55, Aug. 1974.*

* cited by examiner

METHOD OF DESORBING A VOLATILE COMPONENT FROM A SPENT ADSORBENT WITH ROTATING PACKED BED AND METHOD OF RECOVERING 2,2,3,3-TETRAFLURO-1-PROPANOL FROM A GAS STREAM BY ADSORPTION

FIELD OF THE INVENTION

The present invention relates generally to a method of desorbing a volatile component from a spent adsorbent with rotating packed bed, also to a method of recovering 2,2,3,3-tetrafluro-1-propanol from a gas stream by adsorption.

BACKGROUND OF THE INVENTION 2,2,3,3-tetrafluro-1-propanol (abbreviated as TFP hereinafter) has been used as the solvent in the DVD production process because of its high solubility towards cyanine dyes and its high volatility. TFP is expensive and causes a seriously environmental problem after its emission, it therefore is essential to recover it from the exhausted gases.

There are some existing techniques to remove volatile organic compounds from gases such as condensation, adsorption, catalytic oxidation, and thermal oxidation [1]. But to deal with a ppm concentration level, adsorption onto porous adsorbents is believed to be the most appropriate technique. One of the keys for a successful adsorption process is the adsorbent that generally possesses porous structure and a high adsorptive capacity. Among the adsorbents, activated carbon is the most commonly used due to its high surface area and low cost. Because a huge gas flow rate is needed to treat for the recovery of TFP with a ppm concentration in a DVD plant, the adsorption by activated carbon is therefore chosen in the present invention.

When the adsorption approaches saturation, desorption is needed for the subsequent use. The desorption of activated carbon loaded with different adsorbates including benzene, toluene, ethyl acetate, etc, by supercritical carbon dioxide has been proved to be an effective means. The advantages of using supercritical $CO_2$ as the desorbent over the conventional steam desorption technique include a better subsequent adsorption efficiency due to the same temperature in adsorption and desorption, an absence of the condensed water in activated carbon pores, and a safer operation due to its low desorption temperature. Another important aspect to use supercritical fluid desorption for the recovery of TFP is that there is in general no steam in the display and semiconductor industries.

Because the gas containing TFP is exhausted from a clean room, the adsorption of TFP and desorption of activated carbon should be completed in a limited space. Recently, the high-gravity operation has been proved to be more efficient over the packed-bed tower in different unit operations resulting from a significant increase in mass transfer rate [T. Kelleher and J. R. Fair, "Distillation Studies in a High-Gravity Contactor," Ind. Eng. Chem. Res., 35, pp. 4646-4655, 1996; M. Keyvani and N. C. Gardner, "Operating Characteristics of Rotating Beds," Chem. Eng. Prog., 85, pp 48-52, 1989; C. C. Lin and H. S. Liu, "Adsorption in Centrifugal Fields Basic Dye Adsorption by Activated Carbon," Ind. Eng. Chem. Res., 39, pp. 161-167, 2000; and C. C. Lin; W. T. Liu and C. S. Tan, "Removal of Carbon Dioxide by Absorption in a Rotating Packed Bed," Ind. Eng. Chem. Res., 42, pp. 2381-2386, 2003]. High gravity (Higee) first proposed by Ranshaw and Mallinson [C. Ramshaw and R. H. Mallinson, Mass Transfer Process, U.S. Pat. No. 4,283,255, 1981] is an operation in a rotating packed bed (abbreviated as RPB hereinafter) in which the centrifugal force replaces the gravitational force. Due to the presence of a centrifugal force, 20 to 100 gravities depending on rotating speed and radius of the rotating bed can be generated. As a result, the equipment size can be significantly reduced. This would definitely be beneficial for the recovery of TFP in a plant with limited space.

SUMMARY OF THE INVENTION

A primary objective of the present invention is to provide a novel method of desorbing a spent adsorbent. The method involves subjecting a supercritical carbon dioxide in contact with a rotating packed bed of the spent adsorbent.

Another objective of this invention is to recover TFP from a gas stream with a high flow rate and a ppm level of TFP. The adsorption by activated carbon is used to achieve this purpose. The activated carbon particles are packed in a rotating bed though the adsorption is carried out without rotating the bed. The desorption is carried out in a RPB using supercritical carbon dioxide as the desorbent. The synergistic effect of supercritical fluid extraction and centrifugal force on desorption will be examined. In the desorption operation, the effects of pressure, temperature, supercritical $CO_2$ flow rate, and rotating speed on the desorption efficiency are studied.

The present invention provides a method of desorbing a volatile component from a spent adsorbent, wherein the volatile component is adsorbed on the spent adsorbent, the method comprising flowing a stream of supercritical carbon dioxide through a rotating packed bed of the spent adsorbent; and collecting an effluent from the rotating packed bed, which contains supercritical carbon dioxide and the volatile component entrained therein.

Preferably, the adsorbent is activated carbon, alumina, silica or zeolite. More preferably, the adsorbent is activated carbon.

Preferably, the volatile component is a hydrocarbon, an alcohol, an ether, an ester, a halogen-substituted hydrocarbon, a halogen-substituted alcohol, a halogen-substituted ether, a halogen-substituted ester or a mixture thereof. More preferably, the volatile component is a halogen-substituted alcohol. In one of the preferred embodiments, the volatile component is 2,2,3,3-tetrafluro-1-propanol.

Preferably, the desorption method of the present invention further comprises expanding the effluent at a reduced pressure to form a gaseous stream of carbon dioxide with the volatile component entrained therein; and passing the gaseous stream through a cold trap, so that the volatile component is collected in the cold trap and a clean carbon dioxide gaseous stream is discharged from the cold trap.

Preferably, the rotating packed bed of the spent adsorbent is mounted rotatably on an axis in a housing; the stream of supercritical carbon dioxide is fed into an axial area of the rotating packed bed so as to enable the stream of supercritical carbon dioxide to flow radially through the rotating packed bed; and the effluent is discharged from the housing. More preferably, the housing is at a pressure of 7.2-20 MPa, and a temperature of 298-353 K.

Preferably, the rotating packed bed has a speed of 500-2000 rpm.

The present invention also provides a method of recovering 2,2,3,3-tetrafluro-1-propanol from a gas stream, comprising the following steps:

a) flowing a gas stream containing 2,2,3,3-tetrafluro-1-propanol through a packed bed of activated carbon to adsorb 2,2,3,3-tetrafluro-1-propanol onto the activated carbon;

b) flowing a stream of supercritical carbon dioxide through a rotating packed bed of the spent activated carbon resulting from step a) so as to desorb 2,2,3,3-tetrafluro-1-propanol from the spent activated carbon;

c) collecting an effluent from the rotating packed bed, which contains supercritical carbon dioxide and 2,2,3,3-tetrafluro-1-propanol entrained therein;

d) expanding the effluent at a reduced pressure to form a gaseous stream of carbon dioxide with 2,2,3,3-tetrafluro-1-propanol entrained therein; and e) passing the gaseous stream through a cold trap, so that 2,2,3,3-tetrafluro-1-propanol is collected in the cold trap and a clean carbon dioxide gaseous stream is discharged from the cold trap.

Preferably, the rotating packed bed of the spent activated carbon in step b) is mounted rotatably on an axis in a housing; the stream of supercritical carbon dioxide is fed into an axial area of the rotating packed bed so as to enable the stream of supercritical carbon dioxide to flow radially through the rotating packed bed; and the effluent in step c) is discharged from the housing. More preferably, the packed bed of the activated carbon in step a) is mounted rotatably on the axis in the housing but is not rotating; the gas stream containing 2,2,3,3-tetrafluro-1-propanol is fed into an axial area of the packed bed so as to enable the gas stream containing 2,2,3,3-tetrafluro-1-propanol to flow radially through the packed bed; and the resulting gas stream containing a reduced amount of 2,2,3,3-tetrafluro-1-propanol is discharged from the housing. Preferably, the housing during step b) is at a pressure of 7.2-20 MPa, and a temperature of 298-353 K.

Preferably, the packed bed of the activated carbon in step a) and the rotating packed bed of the activated carbon in step b) are kept at substantially the same temperature.

Preferably, the rotating packed bed in step b) has a speed of 500-2000 rpm.

Preferably, the cold trap in step e) comprises a liquid methanol.

Preferably, the method of recovering 2,2,3,3-tetrafluro-1-propanol further comprises repeating steps a) to e), wherein the desorbed activated carbon resulting from step b) is used as the activated carbon in the preceding step a), and the clean carbon dioxide gaseous stream from step e) is used as a source of the stream of supercritical carbon dioxide in step b).

The features and the advantages of the method of the present invention will be more readily understood upon a thoughtful deliberation of the following detailed description of the nonrestrictive embodiments with reference to the accompanying drawings.

DETAILED DESCRIPTION OF THE PREFERRED EMBODIMENTS 2,2,3,3-Tetrafluro-1-propanol (TFP) is effectively recovered from a gas stream by adsorption using activated carbon as the adsorbent at 315 K. The desorption of the loaded activated carbon for the subsequent adsorption use can be successfully achieved by supercritical $CO_2$ in a rotating packed bed. A synergistic effect of supercritical $CO_2$ extraction and centrifugal force on desorption is observed. The higher pressure and rotating speed are, the higher desorption efficiency occurs. Due to a compacted volume of a rotating packed bed and a significant enhancement in desorption efficiency at high centrifugal forces, a rotating packed bed substituted for a fixed packed bed is therefore suggested for the regeneration of the activated carbon loaded with TFP.

Figure 1:
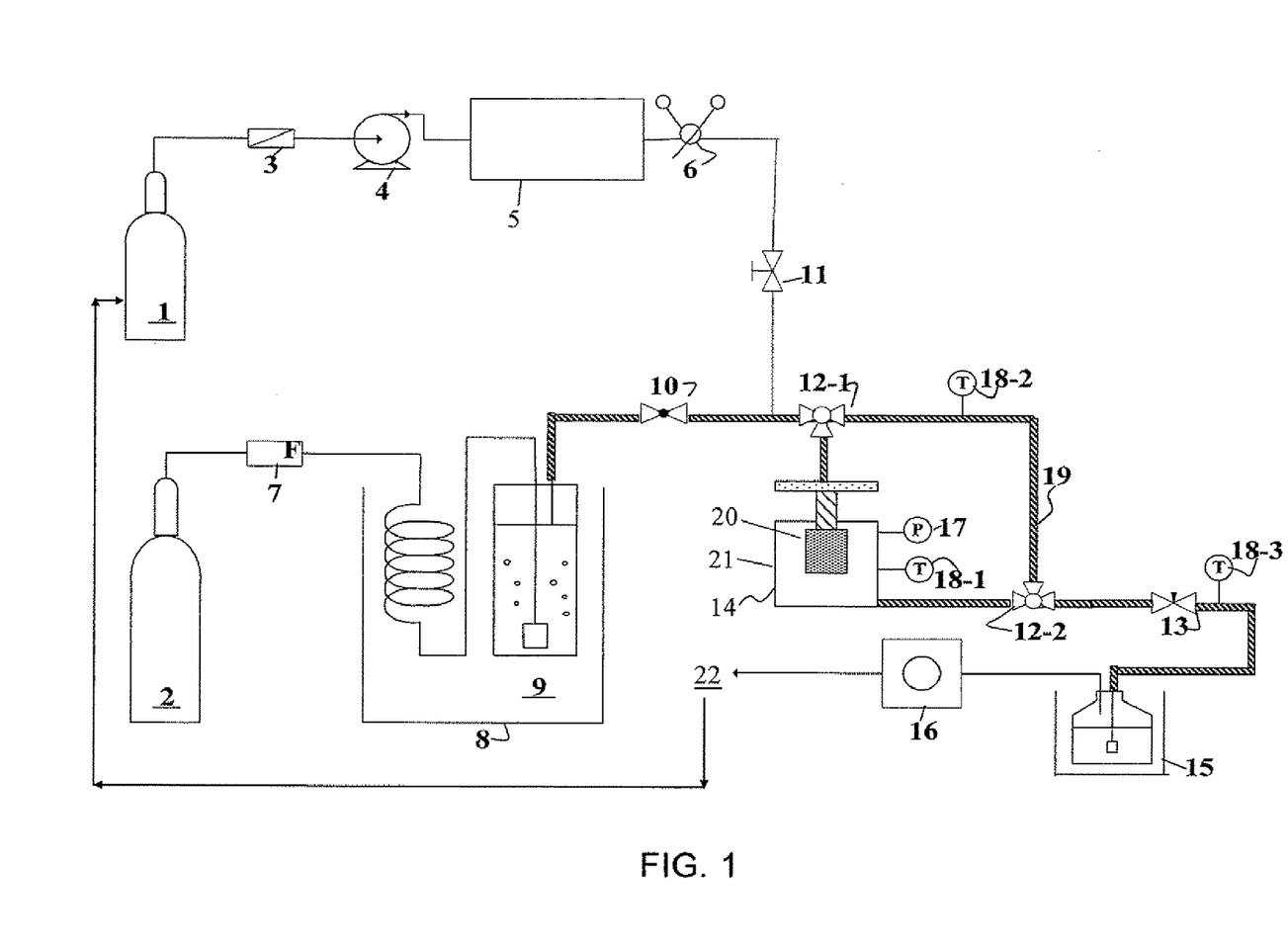
FIG. 1 shows a schematic diagram of an experimental rotating packed bed system suitable for adsorption and desorption according to the present invention.

The experimental apparatus for the adsorption and desorption is illustrated in FIG. 1, and the parts and elements used therein are described as follows with designated numerals:

1. $CO_2$ Cylinder
2. $N_2$ Cylinder
3. Filter
4. Pump
5. Surge Tank
6. Regulator
7. Flow Controller
8. Constant Temperature Oven
9. Saturator
10. Ball Valve
11. Needle Valve
12-1, 12-2. Three Way Valve
13. Metering Valve
14. Rotary Autoclave
15. Cold Trap
16. Wet Gas Meter
17. Pressure Indicator
18-1, 18-2, 18-3. Thermal Couple
19. Heating Tape
20. Packed bed of activated carbon
21. Housing The virgin activated carbon particles (Calgon, WSIV) with an average pore size of 3.81 nm and a BET surface area of 932 $m^2$/g were grounded and screened to obtain the particles with an average diameter of 0.1 cm. The activated carbon particles were boiled in deionized water to remove fines and dried in an oven at 393 K. The treated activated carbon particles mixed with the same size of quartz were then packed in a rotating bed 20 with a diameter of 3.2 cm and a height of 3 cm, which was mounted rotatably on an axis in a housing 21 of the rotary autoclave 14.

In adsorption, 160 $cm^3$ of TFP with a purity of 99.7% (Seedchem) was loaded into a saturator 9 first. The content of TFP in nitrogen (San Fu Gas Company, Taiwan, 99.99%) was prepared by passing the nitrogen stream from the $N_2$ cylinder 2 with a flow rate of 36 $cm^3$/min through the saturator 9. The gas bypassed the packed bed 20 first until the concentration of TFP became steady, and then it flew into the packed bed 20 by switching the three-way valve 12-1. About 1.0 g of the activated carbon particles was packed in the bed. The adsorption was performed at a temperature of 315 K. Because the rotating speed was set as zero, the operation can be regarded as a radial flow in a fixed packed bed 20. TFP in the effluent stream was condensed and collected in a cold trap 15. The collected TFP was analyzed with a flame ionization detector (abbreviated as FID hereinafter) gas chromatographer (China Chromatography, 8900). From the measured concentration of TFP, a breakthrough curve was obtained.

After a certain period of operation, the adsorption was stopped and the subsequent desorption was performed. In the supercritical carbon dioxide desorption stage, carbon dioxide with a purity of 99.5% (San Fu Gas Company, Taiwan) from the $CO_2$ cylinder 1 was compressed by a pump 4 (Milton Roy, NSI-33R) first and then was delivered to and stored in a surge tank 5. The $CO_2$ stream with the desired flow rate and temperature then flew into the rotating packed bed 20 with a preset rotating speed. The pressure was controlled within 1.0% of the desired value. The effluent supercritical $CO_2$ stream was expanded via a metering valve 13. The total volume of the expanded $CO_2$ 22 was measured by a wet gas meter 16 (Shinagawa Co., W-NK-1B) as is used as a source of the stream of supercritical carbon dioxide in step b). TFP in the expanded $CO_2$ was collected in a cold trap 15 in which a 50 mL of methanol was present. A sample in the cold trap was taken out frequently and sent to a FID gas chromatographer for analysis.

Figure 2:
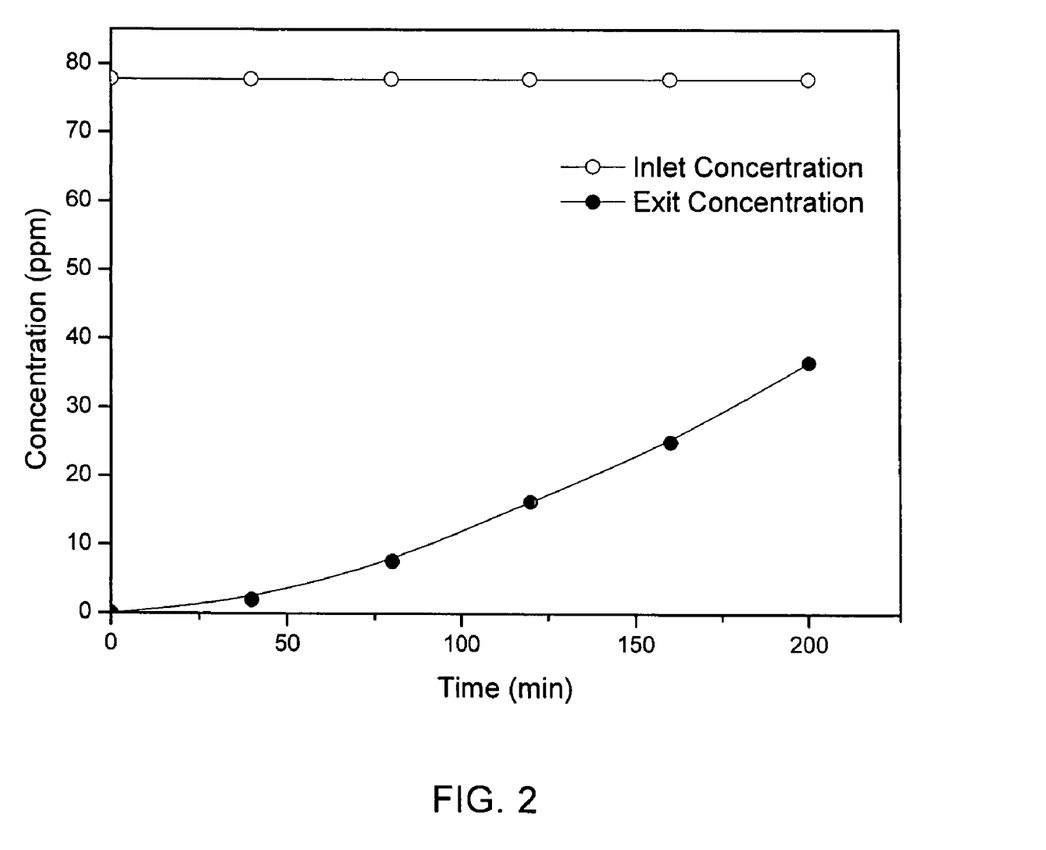
FIG. 2 is a plot showing an adsorption breakthrough curve using activated carbon as the adsorbent for recovering 2,2,3,3-tetrafluro-1-propanol from a gas stream according to the present invention.

The adsorption breakthrough curve at a temperature of 315 K, a gas flow rate of 36 $cm^3$/min, and an inlet concentration of TFP of 78 ppm is shown in FIG. 2. The breakthrough curve in each adsorption and desorption cycle was observed to reproduce with an average deviation of less than 2.0%. In the adsorption, the rotating speed was set as zero. The gas flow was in radial position in the packed bed. It is seen from FIG. 2 that the chosen activated carbon is effective for the removal of TFP, the adsorption capacity of the activated carbon at 200 min is found to be about (0.3 g of TFP)/(g of activated carbon). The equilibrium capacity of the activated carbon towards TFP is definitely higher than that, as seen from FIG. 2. The accumulated amounts of TFP in the cold trap in both the adsorption and desorption stages were compared with the inlet amount of TFP in the adsorption stage, the difference was found to be always less than 5%, indicating a satisfactory mass balance in each cycle.

Figure 3:
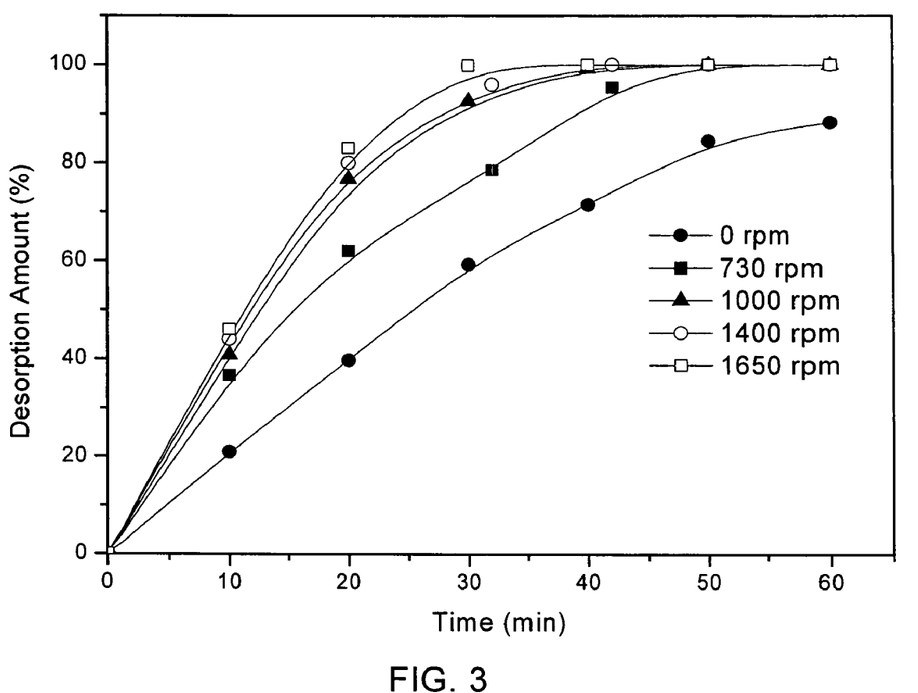
FIG. 3 is a plot showing the effect of rotating speed on desorption at a temperature of 315 K, a pressure of 11.72 MPa, and a $CO_2$ flow rate of 300 $cm^3_N$/min for desorbing 2,2,3,3-tetrafluro-1-propanol from the spent activated carbon according to the present invention.

FIG. 3 shows the desorption efficiency at different rotating speeds for a temperature of 315 K, a pressure of 11.72 MPa, and a supercritical $CO_2$ flow rate of 300 $cm^3_N$/min, wherein "N" in the flow rate unit denotes volume at standard conditions. When the rotating speed is zero, the desorption occurs simply by the extraction of TFP from the loaded activated carbon by supercritical $CO_2$. As the rotating speed is increased, it can be seen from FIG. 3 that the desorption efficiency in a RPB is much enhanced over that in a conventional packed bed, indicating that the centrifugal force plays a positive role in desorption. When the rotating speed is higher than 1400 rpm, a complete desorption can be achieved within 30 min, while only 58% of desorption is achieved in a conventional packed bed under supercritical operation. The enhancement is mainly attributed to a decrease in the interphase mass transfer resistance and possibly to a decrease in the intraparticle diffusion resistance at very high rotating speed.

Figure 4:
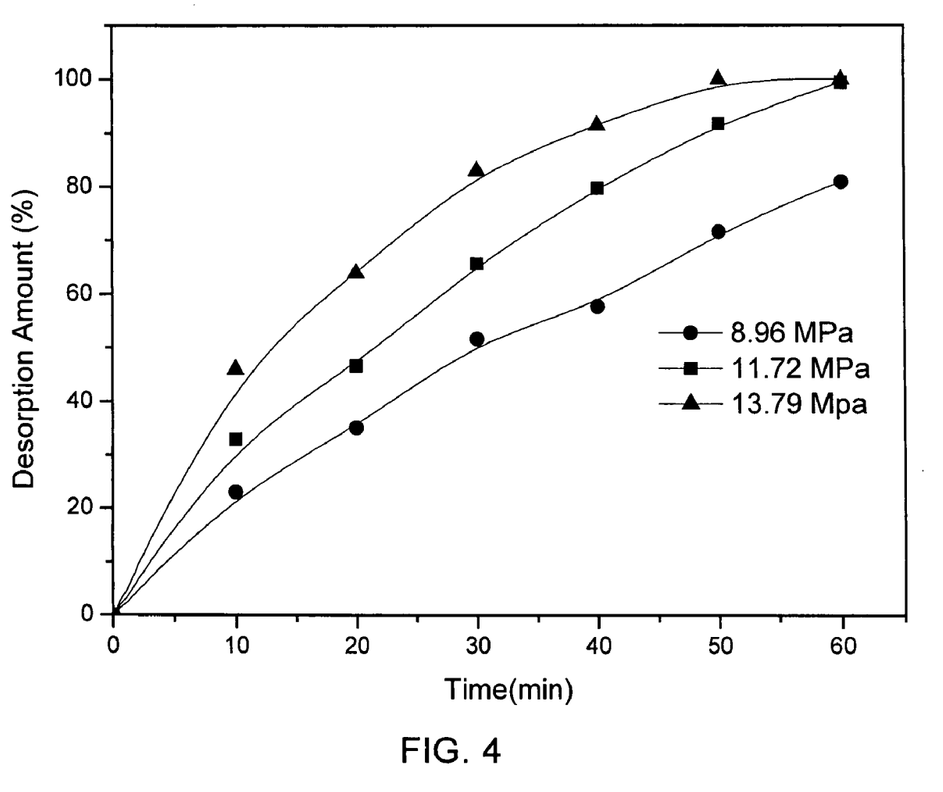
FIG. 4 is a plot showing the effect of pressure on desorption at a temperature of 315 K, a rotating speed of 1000 rpm, and a $CO_2$ flow rate of 200 $cm^3_N$/min for desorbing 2,2,3,3-tetrafluro-1-propanol from the spent activated carbon according to the present invention.

When the desorption temperature, rotating speed, and $CO_2$ flow rate were maintained at 315 K, 1000 rpm, and 200 $cm^3_N$/min, respectively, FIG. 4 shows an increase in desorption efficiency with an increase in pressure. It is known that the solubility of a substance in a supercritical fluid is generally increased with increasing pressure. As a result, more adsorbed TFP onto activated carbon can be extracted by supercritical $CO_2$ at higher pressures, leading to an increase of desorption efficiency as indicated in FIG. 4.

Figure 5:
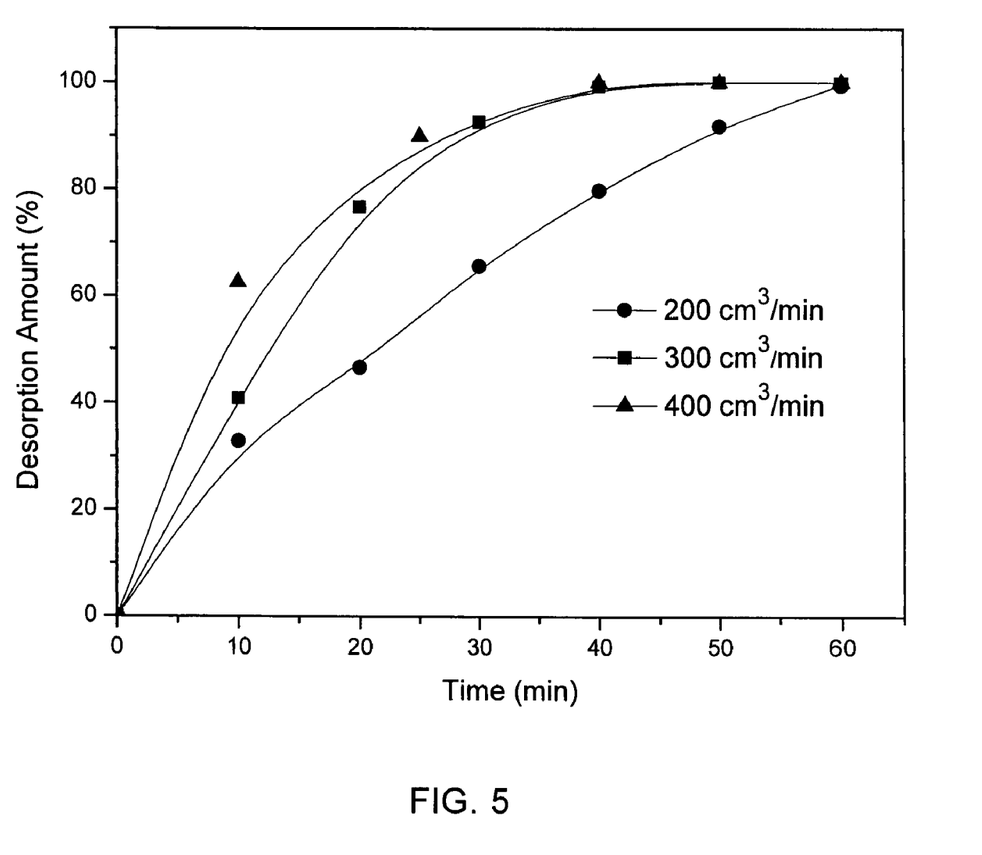
FIG. 5 is a plot showing the influence of flow rate on desorption at a temperature of 315 K, a pressure of 11.72 MPa, and a rotating speed of 1000 rpm for desorbing 2,2,3,3-tetrafluro-1-propanol from the spent activated carbon according to the present invention.

Since interphase mass transfer coefficient is a hydrodynamic property, desorption efficiency is therefore expected to be affected by the flow rate of supercritical $CO_2$. It can also be seen from FIGS. 3 and 4 that $CO_2$ flow rate plays an important role. At a temperature of 315 K, a pressure of 11.72 MPa, and a rotating speed of 1000 rpm, a large discrepancy in desorption efficiency for different $CO_2$ flow rates is observed. A complete desorption can be achieved within 40 min for a $CO_2$ flow rate of 300 $cm^3_N$/min, but less than 80% of desorption is achieved for a $CO_2$ flow rate of 200 $cm^3_N$/min. FIG. 5 shows the dependence of desorption efficiency on $CO_2$ flow rate. A higher $CO_2$ flow rate obviously leads to a higher desorption efficiency. However, the improvement becomes less for a $CO_2$ flow rate higher than 300 $cm^3_N$/min at the given operating conditions. When the other activated carbon and operating conditions were used for the desorption purpose, the same trend was observed. For a use of 0.5 g of the Merck activated carbon (No. 2514), the desorption rate was found to be doubled within a 10 min operation if the $CO_2$ flow rate was increased from 200 to 1000 $cm^3_N$/min at a temperature of 315 K, a pressure of 11.72 MPa, and a rotating speed of 730 rpm.

The temperature effect on the desorption efficiency were also examined by the inventors. The results show that the optimal desorption temperature depends on the desorption pressure, which falls within 305-315 K for the desorption pressure of 8.96-15.86 MPa.

The recovery of TFP from a gas stream containing ppm level of TFP is found to be achieved by the adsorption with an radial flow in a packed bed. For reuse of the activated carbon, the regeneration of the TFP-loaded activated carbon is successfully done by using supercritical $CO_2$ as the desorbent in a rotating packed bed. Because a synergistic effect of supercritical $CO_2$ extraction and centrifugal force on desorption is observed, the proposed regeneration technique is superior to the supercritical $CO_2$ regeneration technique resulting from the presence of the additional centrifugal forces. The higher pressure and rotating speed are observed to result in the higher desorption efficiency. Due to a compacted volume of a rotating packed bed and a significant enhancement in desorption efficiency at high centrifugal forces, a rotating packed bed substitute for a fixed packed bed is therefore suggested.

What is claimed is:

1. A method of recovering 2,2,3,3-tetrafluoro-1-propanol from a gas stream, comprising the following steps:
    a) flowing a gas stream containing 2,2,3,3-tetrafluoro-1-propanol through a packed bed of activated carbon to adsorb 2,2,3,3-tetrafluoro-1-propanol onto the activated carbon;
    b) flowing a stream of supercritical carbon dioxide through a rotating packed bed of the spent activated carbon resulting from step a) so as to desorb 2,2,3,3-tetrafluoro-1-propanol from the spent activated carbon;
    c) collecting an effluent from the rotating packed bed, which contains supercritical carbon dioxide and 2,2,3,3-tetrafluoro-1-propanol entrained therein;
    d) expanding the effluent at a reduced pressure to form a gaseous stream of carbon dioxide with 2,2,3,3-tetrafluoro-1-propanol entrained therein; and e) passing the gaseous stream through a cold trap, so that 2,2,3,3-tetrafluoro-1-propanol is collected in the cold trap and a clean carbon dioxide gaseous stream is discharged from the cold trap, wherein the rotating packed bed of the spent activated carbon in step b) is mounted rotatably on the axis in a housing; the stream of supercritical carbon dioxide is fed into an axial area of the rotating packed bed so as to enable the stream of supercritical carbon dioxide to flow radially through the rotating packed bed; and the effluent in step c) is discharged from the housing; and wherein the packed bed of the activated carbon in step a) is mounted rotatably on the axis in the housing but is not rotating; the gas stream containing 2,2,3,3-tetrafluoro-1-propanol is fed into an axial area of the packed bed so as to enable the gas stream containing 2,2,3,3-tetrafluoro-1-propanol to flow radically through the packed bed; and the resulting gas stream containing a reduced amount of 2,2,3,3-tetrafluoro-1-propanol is discharged from the housing.

2. The method of claim 1, wherein the packed bed of the activated carbon in step a) and the rotating packed bed of the activated carbon in step b) are kept at substantially the same temperature.

3. The method of claim 1, wherein the housing during step b) is at a pressure of 7.2-20 MPa, and a temperature of 298-353 K wherein the rotating packed bed in step b) has a speed of 500-2000 rpm.

4. The method claim 1, wherein the rotating packed bed in step b) has a speed of 500-2000 rpm.

5. The method of claim 1, wherein the cold trap in step e) comprises a liquid methanol.

6. The method of claim 1 further comprising repeating steps a) to e), wherein the desorbed activated carbon resulting from step b) is used as the activated carbon in the preceding step a), and the clean carbon dioxide gaseous stream from, step e) is used as a source of the stream of supercritical carbon dioxide in step b).

* * * * *